United States Patent
Gunugunuri et al.

(10) Patent No.: US 11,471,873 B2
(45) Date of Patent: Oct. 18, 2022

(54) MICROWAVE SYNTHESIS OF IRON OXIDE CATALYSTS FOR COLD START $NO_x$ REMOVAL

(71) Applicant: Toyota Motor Engineering & Manufacturing North America, Inc., Plano, TX (US)

(72) Inventors: Krishna Gunugunuri, Canton, MI (US); Charles Alexander Roberts, Farmington Hills, MI (US); Torin C. Peck, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 478 days.

(21) Appl. No.: 16/520,848

(22) Filed: Jul. 24, 2019

(65) Prior Publication Data

US 2021/0023546 A1    Jan. 28, 2021

(51) Int. Cl.
*B01J 37/34* (2006.01)
*B01J 37/03* (2006.01)
(Continued)

(52) U.S. Cl.
CPC .............. *B01J 37/346* (2013.01); *B01J 23/76* (2013.01); *B01J 37/031* (2013.01); *B01J 37/06* (2013.01); *F01N 3/0814* (2013.01)

(58) Field of Classification Search
CPC ........ B01J 37/346; B01J 23/76; B01J 37/031; B01J 37/06; B01J 23/78; F01N 3/0814; F01N 3/101; F01N 3/2066; Y02T 10/12
(Continued)

(56) References Cited

U.S. PATENT DOCUMENTS

2007/0048605 A1    3/2007    Pez et al.
2008/0026932 A1    1/2008    Satoh et al.

FOREIGN PATENT DOCUMENTS

CN    105047346 A    11/2015

OTHER PUBLICATIONS

Yang et al. "Synthesis of Monodisperse Iron Oxide Nanoparticles without Surfactants" Journal of Nanomaterials, vol. 2014, Article ID 740856, 5 pages, 2014. https://doi.org/10.1155/2014/740856 (Year: 2014).*

(Continued)

*Primary Examiner* — Colin W. Slifka
(74) *Attorney, Agent, or Firm* — Christopher G. Darrow; Darrow Mustafa PC

(57) ABSTRACT

Methods of making an iron based catalyst using microwave hydrothermal synthesis are provided. The methods include dissolving iron(III) nitrate, $Fe(NO_3)_3$, in an organic solvent to form a solution. Once dissolved, the methods include a step of neutralizing the solution with an alkaline mineralizing agent to obtain a precipitate. The solution with the precipitate is then subjected to microwave radiation to cause a temperature gradient and a hydrothermal crystallization process to form a synthesized product. The synthesized product is subsequently separated from the mineralizing agent. The method includes washing and drying the synthesized product to obtain particles of sodium iron oxide ($NaFeO_2$) catalyst that can be used as a composition for a passive $NO_x$ adsorber. A two-stage $NO_x$ abatement device for removal of $NO_x$ from an exhaust gas stream during a cold start operation of an internal combustion engine is also provided.

10 Claims, 3 Drawing Sheets

(51) Int. Cl.
  *F01N 3/08* (2006.01)
  *B01J 23/76* (2006.01)
  *B01J 37/06* (2006.01)
(58) Field of Classification Search
  USPC .................................................. 502/325
  See application file for complete search history.

(56) References Cited

OTHER PUBLICATIONS

Fernández-Barahona et al. "Microwave-Driven Synthesis of Iron-Oxide Nanoparticles for Molecular Imaging" Molecules 2019, 24(7), 1224; https://doi.org/10.3390/molecules24071224 (Year: 2019).*
Alzahrani et al. "Microwave-Hydrothermal Synthesis of Ferric Oxide Doped with Cobalt" Advances in Nanoparticles, 2015, 4, 53-60 (Year: 2015).*
Li, K. et al., "Low temperature synthesis of Fe2O3 and LiFeO2 as cathode materials for lithium-ion batteries," Electrochimica Acta 136 (2014) pp. 10-18.
Pan, R. et al., "Synthesis of Fe3O4 Nanotubes Under Assistance of Microwave by Tuning Chemical Deposition Mechanism and its Magnetic Properties", Applied Mechanics and Materials, vol. 492 (2014) pp. 258-262.
Liu, X. et al., "Dechlorination of PCBs in the simulative transformer oil by microwave-hydrothermal reaction with zero-valent iron involved," Chemosphere 82 (2011) pp. 773-777.
Qiu, G. et al., "Microwave-Assisted Hydrothermal Synthesis of Nanosized α-Fe2O3 for Catalysts and Adsorbents", J. Phys. Chem C, 115 (2011) pp. 19626-19631.
Li, Y. et al., "Hydrothermal Synthesis of Ultrafine α-Fe2O3 and Fe3O4 Powders," Materials Research Bulletin, vol. 33, No. 6 (1998) pp. 841-844.
Zhao, W. et al., "Direct microwave-hydrothermal synthesis of Fe-doped titania with extended visible-light response and enhanced H2-production performance," Chemical Engineering Journal 283 (2016) pp. 105-113.
Asuha, S. et al., "Water-soluble, mesoporous Fe3O4: Synthesis, characterization, and properties," Ceramics International 38 (2012) pp. 6579-6584.
Xavier, C.S. et al., "Microwave-assisted Hydrothermal Synthesis of Magnetite Nanoparticles with Potential Use as Anode in Lithium Ion Batteries," Materials Research (2014) 6 pages (DOI: http://dx.doi.org/10.1590/1516-1439.264714).
Aivazoglou, E. et al., "Microwave-assisted synthesis of iron oxide nanoparticles in biocompatible organic environment," AIP Advances 8, 048201 (2018) (doi: 10.1063/1.4994057) pp. 048201-1-048201-14.
Zheng, B. et al., "Fast Microwave Synthesis of Fe3O4 and Fe3O4/Ag Magnetic Nanoparticles Using Fe2+ as Precursor," vol. 48, No. 10 (2010) pp. 1106-1111.
Salavati-Niasari, M. et al., "Easy Synthesis of Magnetite Nanocrystals via Coprecipitation Method," J Clust Sci 23 (2012) pp. 597-602.
Zhibo, X. et al., "Selective catalytic reduction of NOx with NH3 over iron-cerium mixed oxide catalyst: catalytic performance and characterization," J Chem Technol Biotechnol 88 (2013) pp. 1258-1265.
Li, C. et al., "Microwave-solvothermal synthesis of Fe3O4 magnetic nanoparticles," Materials Letters 107 (2013) pp. 23-26.
Chen, L. et al., "Direct Synthesis and characterization of mesoporous Fe3O4 through pyrolysis of ferric nitrate-ethylene glycol gel," Journal of Alloys and Compounds 509 (2011) pp. L1-L5.
Hu, X. et al., "α-Fe2O3 Nanorings Prepared by a Microwave-Assisted Hydrothermal Process and Their Sensing Properties**", Adv. Mater. 19 (2007) pp. 2324-2329.
Yulin, L. et al., "Selective Catalytic Reduction of NOx over Fe/TiO2 Prepared by F127-Template Method at Mid-Temperature," J Environ Anal Chem 3:3 (2016) pp. 1-5.

* cited by examiner

MICROWAVE SYNTHESIS OF IRON OXIDE CATALYSTS FOR COLD START NO$_x$ REMOVAL

TECHNICAL FIELD

The present disclosure generally relates to catalysts for treatment of an exhaust gas stream and, more particularly, to microwave synthesis of iron oxide catalysts for cold start storage and subsequent release of nitrogen oxides from the exhaust gas stream.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NO$_x$ from exhaust emissions are desirable in order to protect the environment and to comport with regulations directed to that purpose. It is preferable that such catalysts convert NO$_x$ to inert nitrogen gas, instead of converting NO$_x$ to other nitrogen-containing compounds. Leading NO$_x$ abatement techniques typically have light-off temperatures greater than about 200° C. High fuel efficiency combustion modes in new-generation internal combustion engines may have a relatively lower operating temperature, however, and may cause a considerable decrease in exhaust temperatures. In the example of a catalytic converter, a decrease in exhaust temperature generally extends the time required to warm up catalytic converter in order for the reactions to take place. In this regard, improved adsorption materials and catalysts for use with passive NO$_x$ adsorbers (PNA's), as well as methods for making the same, have additional utility.

Accordingly, it would be desirable for an improved PNA catalyst that provides for the effective storage of NO$_x$ from exhaust gas at low temperature, and subsequently provides the release of the NO$_x$ at suitably higher temperatures.

SUMMARY

This section provides a general summary of the disclosure, and is not a comprehensive disclosure of its full scope or all of its features.

In various aspects, the present teachings provide a method of making an iron based catalyst using microwave hydrothermal synthesis. The method includes dissolving iron(III) nitrate, Fe(NO$_3$)$_3$, in an organic solvent to form a solution. Once dissolved, the method includes a step of neutralizing the solution with an alkaline mineralizing agent to obtain a precipitate. The solution with the precipitate is then subjected to microwave radiation to cause a temperature gradient and a hydrothermal crystallization process to form a synthesized product. The synthesized product is subsequently separated from the mineralizing agent. The method includes washing and drying the synthesized product to obtain particles of sodium iron oxide (NaFeO$_2$) catalyst that can be used as a composition for a passive NO$_x$ adsorber (PNA).

In other aspects, the present teachings provide a PNA composition or material including the sodium iron oxide catalyst made according to the above method.

In still further aspects, the present teachings provide a two-stage NO$_x$ abatement device for removal of NO$_x$ from an exhaust gas stream during a cold start operation of an internal combustion engine. The abatement device includes an enclosure having upstream and downstream portions defined relative to an intended direction of flow of the exhaust gas stream. The device includes a low temperature passive NO$_x$ adsorber (PNA) exhibiting NO$_x$ storage functionality in a first temperature range, and exhibiting NO$_x$ desorption behavior in a second, elevated temperature range. The PNA includes nanoparticles of a sodium iron oxide (NaFeO$_2$) oxide prepared using microwave hydrothermal synthesis techniques with an organic solvent. A NO$_x$ conversion catalyst is provided, located downstream from the PNA, and configured to catalyze conversion of NO$_x$. During the cold start operation, NO$_x$ is retained in the PNA until the exhaust gas stream and the abatement device have warmed to a temperature sufficient to activate the NO$_x$ conversion catalyst.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
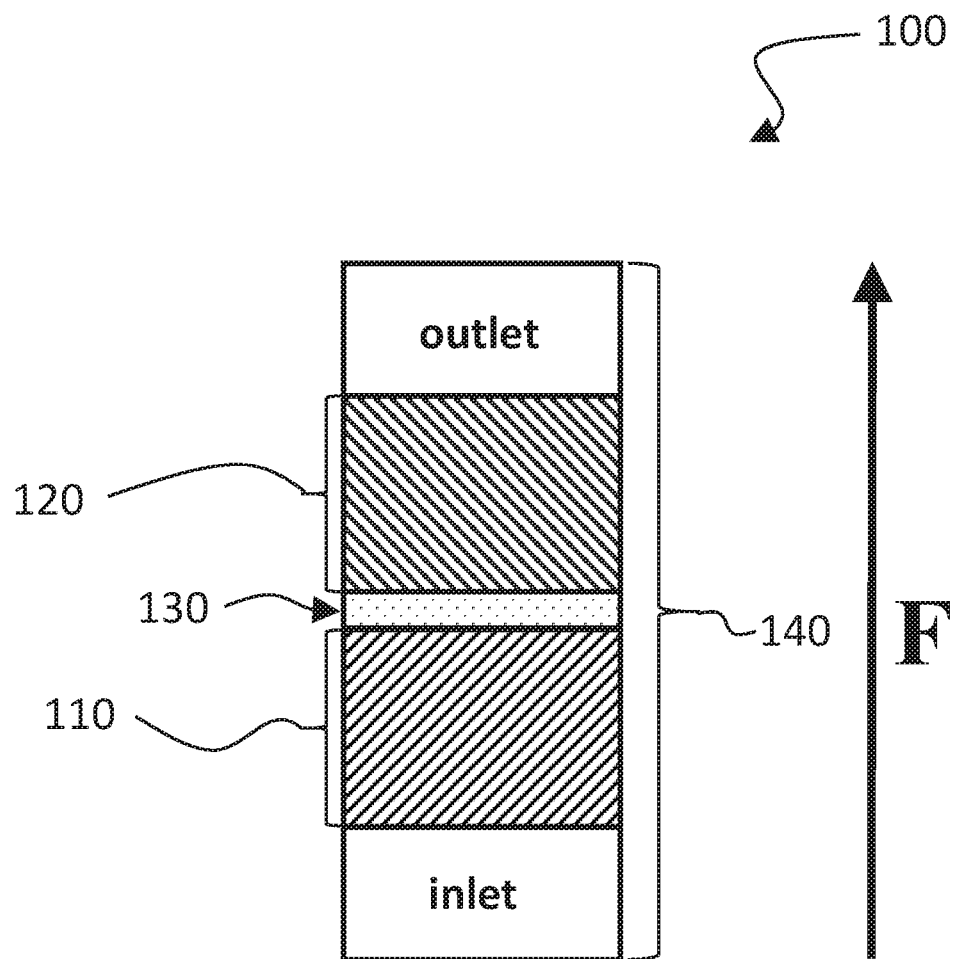
FIG. 1 shows a schematic plan view of an exemplary two-stage NO$_x$ abatement device that can be used with the iron oxide catalyst of the present disclosure.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide enhanced iron-based catalysts for the short term storage and subsequent desorption (for the ultimate reduction/removal) of nitrogen oxides (NO$_x$)) from an exhaust gas stream of an internal combustion engine, and methods for making the same.

Nitric oxide (NO) and nitrogen dioxide (NO$_2$) are noxious components of combustion exhaust streams. Many catalysts for abating NO and NO$_2$ (NO$_x$)) produce undesirable products, such as nitrous oxide (N$_2$O) or ammonia. Direct decomposition reactions, in which NO$_x$ is converted directly to $N_2$ and $O_2$ are known, but catalysts for direct decomposition frequently have low activity and/or selectivity to $N_2$ at temperatures less than about 200° C. Most conversion catalysts have little-to-no activity such that $NO_x$ is not converted during vehicle "cold start" conditions, when exhaust and catalytic converter temperatures are low.

Improved catalysts with lower operational temperatures and/or enhanced storage/desorption capabilities can be particularly helpful with the high fuel efficiency combustion modes that are becoming available in new-generation internal combustion engines, which may exhibit a considerable decrease in exhaust temperatures. More specifically, the lower exhaust temperatures pose a great challenge for current lean $NO_x$ ($NO+NO_2$) control technologies to meet the strict $NO_x$ emission standards that mandate a significant reduction in cold-start $NO_x$ emission.

For example, various leading $NO_x$ abatement techniques, i.e., three-way catalysis ("TWC"), lean $NO_x$ trap ("LNT"), and selective catalytic reduction ("SCR"), all have light-off temperatures typically above 200° C. The decreasing exhaust temperature extends the time required for the inlet exhausts to warm up the catalytic convertors in order for the appropriate reactions to take place. As a result, a majority of the tailpipe $NO_x$ emission may be emitted during the cold-start period of the vehicles. For SCR techniques, the technology relies on on-board $NH_3$ generation via urea decomposition at temperatures above about 180° C. As such, non-catalytic obstacles, e.g., urea deposition and clogging, can also occur during cold starts.

Passive $NO_x$ adsorbers (PNA's), which retain NOx at low temperature and release it at higher temperature, can help minimize issues related to cold-start $NO_x$ emission. For example, desirable PNA materials are capable of rapidly adsorbing a high capacity of $NO_x$ at a location upstream of the catalytic convertor, for example, a TWC or an SCR and retaining the adsorbed $NO_x$ species for the short time required to increase a temperature of the system to an operating temperature, usually about 2-3 minutes. Thereafter, the PNA material should release, or desorb, the stored $NO_x$ so that it can be reduced by the downstream reduction catalyst.

In this regard, the stored $NO_x$ should be readily released once the TWC/SCR system becomes operational, without a rich regeneration. In contrast, an LNT catalyst only adsorbs $NO_2$ and requires periodical chemical reduction via rich purging to release stored $NO_x$. The PNA thermally releases $NO_x$ under continuous lean conditions at higher temperatures, e.g., from about 200° C. to about 350° C., or about 400° C., where the catalytic convertor functions efficiently. The elimination of the need for the rich purging significantly enhances fuel economy and engine durability and simplifies electronic controlling.

Ceria/alumina-supported Pd/Pt and zeolite-supported Pd are two typical PNA formulations. For the former formulation, the use of ceria/alumina instead of alkaline earth oxide (e.g., BaO) used for LNT enables low-temperature $NO_x$ storage as nitrites, negating the need to oxidize NO to $NO_2$. Nitrites decompose readily at temperatures above 200° C. However, the susceptibility to sulfur poisoning, especially for ceria-based materials, limits their practical application. Notably, zeolite-supported Pd catalysts also suffer at higher temperature, due to poor thermal stability.

The presently disclosed iron-oxide catalysts are useful with PNA applications and, as discussed in more detail below, are synthesized with the assistance of microwave hydrothermal synthesis methods and using an organic solvent, such as ethanol. The resulting iron-oxide catalysts exhibit superior $NO_x$ storage at relatively low temperatures, or cold-start conditions with temperatures from between about 50° C. and about 100° C. The iron-oxide catalysts additionally exhibit excellent $NO_x$ desorption behavior at subsequent elevated temperatures, typical of desired engine operating range temperatures, such as temperatures from between about 200° C. to about 400° C. In various aspects as will be described below, the desorption of $NO_x$ from the iron-oxide catalysts reaches a level of 98% at temperatures above 200° C., which is very beneficial for practical applications. Once desorbed, the $NO_x$ can be reduced at a downstream three-way catalyst, $NH_3$-SCR catalyst, and/or NO decomposition catalysts.

In various aspects, the present technology provides iron-based catalysts utilizing microwave hydrothermal synthesis methods with an organic solvent, such as ethanol, that yields sodium iron oxide ($NaFeO_2$) particles that adsorb $NO_x$ at a first lower temperature range (100° C.-200° C.) and release $NO_x$ at second higher temperature range (200° C.-400° C.).

Microwave irradiation used in microwave hydrothermal synthesis is not only a distinct form of heat, but it also enhances reactivity of a reaction. With respect to mineral treatment processes, and sintering of ceramics, a wide variety of chemical reactions can be accelerated by microwave irradiation on reactants. Microwave irradiation can also increase the chemical reactivity of reagents. In comparison with other heating methods, reactions under microwave irradiation may have higher reaction rates and produce yields in shorter time periods. Hydrothermal techniques are suitable for the synthesis of ultrafine materials with homogeneous composition and adequate morphology for use in multiple technological purposes. Microwave hydrothermal methods combine the advantages of both microwave-irradiation and hydrothermal techniques, including short reaction times, production of small particles with a narrow size distribution, and high purity.

Studies have shown that in initial microwave processing stages, the microwave radiation is able to promote localized superheating in the solutions, as well as accelerate solid particles to high velocities. This leads to an increase in the interparticle collisions, and induces effective fusion at the point of collision. In principle, this kind of electromagnetic energy can induce a uniform heating inside the primary particles formed after nucleation stage. Without being bound by theory, it is believed that all of these efforts caused by the microwave radiation may favor the formation of aggregated particles with irregular shapes; may provide more beneficial morphologies; and thus affect the mechanism of the adsorption and desorption processes in the PNA.

The present technology provides methods of synthesizing $NO_x$ abatement compositions, such as iron oxide catalysts, with the assistance of microwave hydrothermal synthesis. The methods generally begin by mixing and dissolving iron(III) nitrate, $Fe(NO_3)_3$, in an organic solvent to form a solution. In various aspects, the organic solvent includes at least one of ethanol, propanol, butanol, and ethylene glycol. Once dissolved, the method includes a step of neutralizing the solution with an alkaline mineralizing agent to obtain a precipitate. As used herein, the pH of a neutralized solution may be in a range of from about 9 to about 11, which results in the precipitate formation. This step can alternatively be referred to as an alkaline precipitation step. The alkali can include NaOH, another hydroxide, or any other suitable alkaline material. For example, the mineralizing agent includes at least one of sodium hydroxide, sodium carbonate, ammonium hydroxide, and ammonium carbonate. In one preferred aspect, for example, the solvent includes ethanol, and the mineralizing agent includes sodium hydroxide in order to arrive at a desirable morphology of the iron oxide catalyst. The solution with the precipitate is then subjected to microwave radiation to cause a temperature gradient and a hydrothermal crystallization process to form a synthesized product. In various examples, the hydrothermal crystallization process is performed at a temperature of from about 140° C. to about 170° C., or about 160° C., for about 10 minutes. The synthesized product is subsequently separated from the mineralizing agent. The method may include washing and drying the synthesized product to obtain particles of sodium iron oxide ($NaFeO_2$) catalyst that can be used as a composition for a passive $NO_x$ adsorber (PNA).

In certain aspects, it may be desirable to replace a portion of the iron(III) nitrate with other metal nitrates that may include transition metals. In one non-limiting example, a mixed metal nitrate solution may be provided that contains $Fe(NO_3)_3$ and at least one additional metal nitrate selected from $Co(NO_3)_2$, $Zn(NO_3)_2$, $Cu(NO_3)_2$, and $Ni(NO_3)_2$. In various aspects, the molar ratio of iron to the other transition metal can be greater than 2 and less than 3. For example, the various transition metal may be present relative to iron at a molar ratio within a range of from about 1:2 to about 1:3. The synthesis method can additionally include steps of grinding the resulting iron oxide catalyst to provide an $NO_x$ abatement composition of a desired particle size (nanoparticles), and/or calcining the $NO_x$ abatement composition to remove volatile impurities.

The present technology also provides a two-stage method for removal of $NO_x$ from an exhaust gas stream. The method for removal of $NO_x$ from an exhaust gas stream includes a step of flowing the exhaust gas stream through a two-stage system. The term "two-stage" as used with respect to the method indicates that the exhaust gas stream is exposed to two distinct catalysts: the first iron oxide based catalyst provided as a PNA material to adsorb, store, and later desorb the $NO_x$, at a higher temperature, and the second catalyst provided downstream for the conversion of the $NO_x$. In various aspects, the PNA is provided as an independent PNA material/component of the abatement device. In other aspects, the PNA can be provided as a wash coat layer, for example, on a honeycomb shaped component. It can be provided as a multi-layered coating, or can be provided in zoned areas.

Still further, the present technology also provides an apparatus for removal of $NO_x$ from an exhaust gas stream. Such an apparatus generally includes an enclosure; an inlet, configured to receive the exhaust gas stream into the enclosure; and an outlet, configured to allow the exhaust to exit the enclosure. FIG. 1 illustrates a schematic plan view of an exemplary two-stage device 100. The device 100 can include an enclosure 140 having an inlet and an outlet. The enclosure 140 can be configured to contain a low-temperature $NO_x$ storage component 110, such as a PNA, and a high-temperature $NO_x$ conversion catalyst 120 located downstream from the storage component. The $NO_x$ storage component 110 is configured to adsorb $NO_x$ when at low temperature, and to desorb $NO_x$ when at higher temperature. The $NO_x$ storage component 110 will generally include an $NO_x$ abatement catalyst composition of the present teachings, having the formula $NaFeO_2$, as prepared using the microwave hydrothermal methods described above.

The $NO_x$ conversion catalyst 120 is generally configured to catalyze conversion of $NO_x$, through any of the typical conversion reactions know in the art. In certain implementations, the conversion catalyst 120 can specifically exclude an $NO_x$ abatement catalyst composition of the present teachings. In certain implementations, the conversion catalyst 120 can include a catalyst operable to catalyze direct $NO_x$ decomposition, according the Reactions I and/or II, as follows:

$$2NO \rightarrow N_2 + O_2 \quad \text{(I), and}$$

$$2NO_2 \rightarrow N_2 + 2O_2 \quad \text{(II).}$$

Direct decomposition reactions are generally distinguishable from competing reactions by product formation. For example, incomplete decomposition reactions such as exemplary Reactions III and IV produce undesirable nitrous oxide rather than nitrogen gas:

$$4NO \rightarrow 2N_2O + O_2 \quad \text{(III), and}$$

$$4NO_2 \rightarrow 2N_2O + 3O_2 \quad \text{(IV).}$$

Similarly, various selective catalytic reduction (SCR) reactions can occur in the presence of a gaseous reducing agent, such as ammonia or alkane, and produce water, or water and carbon dioxide, rather than oxygen gas, as exemplified in Reactions V through VIII:

$$4NO + 4NH_3 + O_2 \rightarrow 4N_2 + 6H_2O \quad \text{(V),}$$

$$2NO_2 + 4NH_3 + O_2 \rightarrow 3N_2 + 6H_2O \quad \text{(VI),}$$

$$NO + CH_4 + O_2 \rightarrow N_2 + CO_2 + 2H_2O \quad \text{(VII), and}$$

$$2NO_2 + 2CH_4 + 2O_2 \rightarrow N_2 + 2CO_2 + 2H_2O \quad \text{(VIII).}$$

When oxygen is present, $NO_x$ may also be oxidized, such as shown in Reaction IX:

$$2NO + O_2 \rightarrow 2NO_2 \quad \text{(IX).}$$

Under controlled reaction conditions where catalyst is exposed to a gas flow containing nitric oxide, any or all of Reactions I and IV can occur primarily, but Reaction IX can also occur secondarily as $O_2$ is produced by reactions I and IV. A combined reaction is shown in Reaction X:

$$(4a+4c-2b)NO \rightarrow aN_2 + bO_2 + cN_2O + (2a-2b+c)NO_2 \quad \text{(X)}$$

In some implementations, the storage component 110 and the conversion catalyst 120 can be spatially separated from one another. In such implementations, the storage component 110 and the conversion catalyst 120 can be separated by a separation space 130. When present, such a separation space can be substantially vacant, or can be occupied with a porous, gas permeable, or other suitable material.

As is commonly known to those of ordinary skill in the art, devices useful with the present technology can be configured to receive an exhaust gas stream through the inlet and to exit the exhaust gas stream through the outlet, such that the exhaust gas stream has a particular or defined flow direction. The terms "upstream" and "downstream" are used herein in relation to an intended direction of exhaust gas stream flow through the device 100, represented by the arrow F in FIG. 1. For example, the storage component 110 can be positioned in an upstream portion of the exhaust gas stream, a region proximal to a gas inlet portion, and the conversion catalyst 120 can be positioned in a downstream portion of the exhaust gas stream, a region proximal to a gas outlet portion.

It will be understood that in implementations in which the storage component 110 is positioned in an upstream portion of the exhaust gas stream and the conversion catalyst 120 is positioned in a downstream portion of the exhaust gas stream, this can cause the exhaust gas stream to encounter the storage component 110 before the exhaust gas stream encounters the conversion catalyst 120.

Thus, during a vehicle "cold start", when exhaust gas is at relatively low temperature, the low temperature exhaust gas will first encounter the storage component 110, where it will be adsorbed and stored. As the exhaust gas warms with increasing duration of engine operation, the storage component 110 will warm as well, resulting in desorption of the temporarily stored $NO_x$, so that the $NO_x$ can flow downstream to the conversion catalyst. It will be understood that most $NO_x$ conversion catalysts will have low-to-negligible catalytic activity at low, cold start temperatures. Thus, one benefit of the present device 100 is that cold $NO_x$ will be retained in the storage component until the exhaust and the device 100 have warmed sufficiently to activate the downstream conversion catalyst 120. As such, it will be desirable that the conversion catalyst 120 be thermally matches with the storage component 110. For example, it may be desirable that the conversion catalyst 120 achieve at least 50% of maximum catalytic activity at a temperature of 300° C. or 400° C., so that it will be sufficiently active when $NO_x$ desorption from the storage component 110 begins.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Comparative Example

Formation of Iron Oxide Nanoparticle Catalysts

Two iron oxide catalysts are prepared, one with water as a solvent that yields $Fe_3O_4$ particles, and one with ethanol as a solvent that yields $NaFeO_2$ particles.

In a beaker, $Fe(NO_3)_3$ is dissolved in deionized water or ethanol and stirred to form respective sample solutions. Each solution is then neutralized by the addition of a mineralizing agent. For example, sodium hydroxide dissolved in either water or ethanol (as above) is added to the solution. A black precipitated is then obtained. These respective resulting materials are sealed in a 30 ml microwave reaction vial using Teflon spectrum film. Each microwave reaction vial is placed in a microwave reactor (Anton Paar, Monowave 300) and crystallization is accomplished at a temperature of about 160° C. for about 10 mins. The respective resulting black products are washed several times with either deionized water or ethanol (as above) until the mineralizing agent is removed. The precipitate is then separated by filtration techniques. Each resulting precipitate is dried in conventional furnace at a temperature of about 120° C. for about 12 hours to obtain the $Fe_3O_4$ and $NaFeO_2$ catalysts.

$NO_x$ Storage Experiments $NO_x$ storage experiments are performed for both respective iron oxide catalysts ($Fe_3O_4$ and $NaFeO_2$) prepared using water and ethanol in a Netzsch thermogravimetric analyzer coupled with mass spectroscopy. Prior to storage, each iron oxide catalyst material is pretreated by heating to a temperature of about 600° C. in the presence of Ar to remove any adsorbed impurities. After the pretreatment, the temperature is decreased to about 100° C. The $NO_x$ storage is performed at about 100° C. for about 30 min using 1.5% NO balanced He. After completing the $NO_x$ storage phase, the temperature is ramped from 100° C.-600° C. in the presence of He to desorb the NO.

Figure 2:
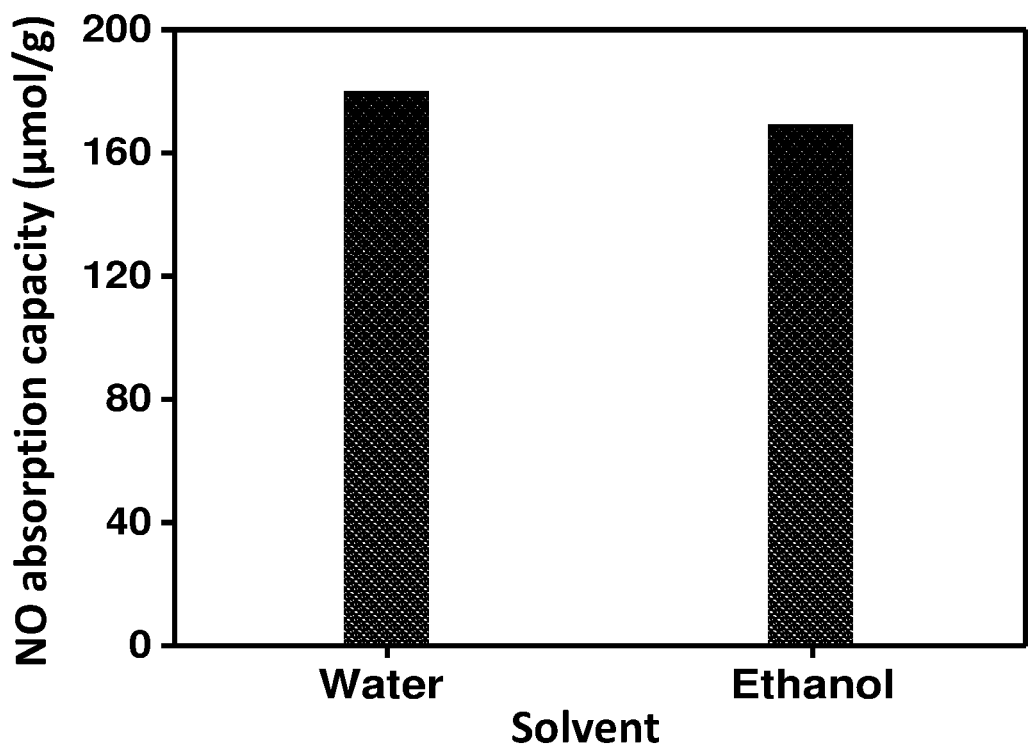
FIG. 2 is a graphic illustration comparing NO$_x$ storage capacity values of the iron based catalyst synthesized by microwave hydrothermal methods using water and ethanol as solvents.

FIG. 2 is a graphic illustration comparing $NO_x$ storage capacity values of the iron based catalyst synthesized by microwave hydrothermal methods using water and ethanol as solvents. As shown, the capacities are similar at the temperature of about 100° C.

Figure 3:
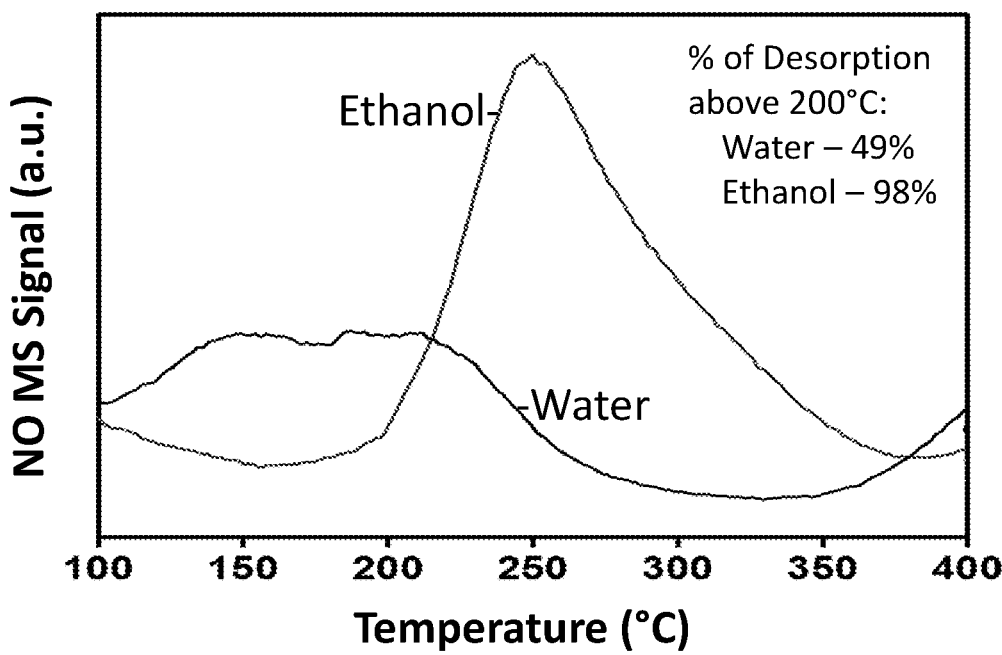
FIG. 3 is a graphic illustration comparing the desorption behavior of the iron based catalyst synthesized by microwave hydrothermal methods using water and ethanol as solvents.

FIG. 3 is a graphic illustration comparing the desorption behavior of the iron based catalyst synthesized by microwave hydrothermal methods using water and ethanol as solvents. As shown, it is discovered that only 49% of the $NO_x$ is desorbed at a temperature greater than 200° C. for the catalyst synthesized using water, while 98% of the NOx is desorbed at a temperature greater than 200° C. for the catalyst synthesized using an organic solvent such as ethanol.

After the adsorption at lower temperatures between about 50° C. up to about 200° C., it is important that the catalyst desorb the adsorbed $NO_x$ at higher temperatures (>200° C.) so that under floor catalyst is warm enough to further convert the $NO_x$ into $N_2$ and $O_2$. If the catalyst desorbs $NO_x$ before 200° C., it won't be converted by three-way catalyst and $NO_x$ will be emitted out of the exhaust pipe. The $NO_x$ desorption profiles of iron based catalysts as presented in FIG. 3 indicate that the catalyst synthesized using water as a solvent is not desirable for most, if any, practical applications. On the other hand, the catalysts synthesized using ethanol as solvent desorb 98% of the $NO_x$ after 200° C., which is very good for practical applications.

Figure 4:
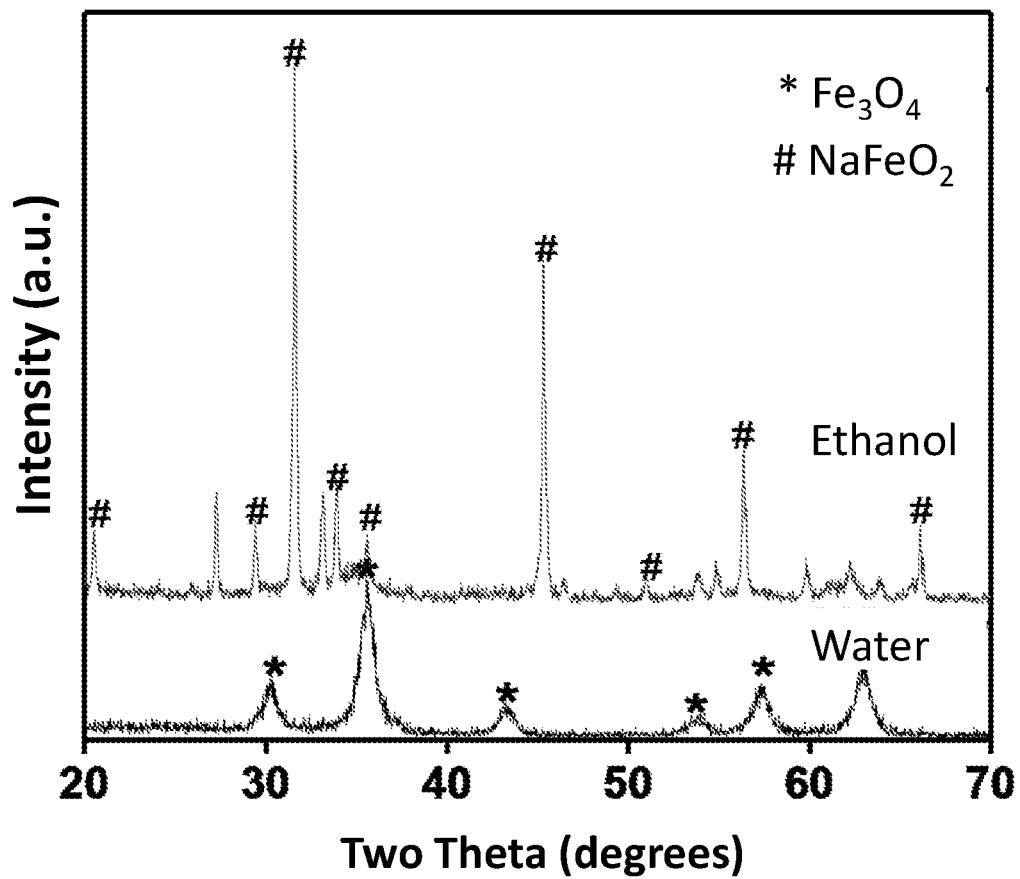
FIG. 4 is a graphic illustration comparing the X-ray diffraction patterns of the iron based catalyst synthesized by hydrothermal methods using water and ethanol as solvents.

FIG. 4 is a graphic illustration comparing the X-ray diffraction patterns of the iron based catalyst synthesized by hydrothermal methods using water and ethanol as solvents. X-ray powder diffraction (XRD) patterns are obtained for the two catalysts using Rigaku SmartLab X-ray diffractometer, with Cu Ka radiation (1¼ 1.5405 A). A glass holder is used to support each of the samples. The scanning range was from 10 to 80 (2θ) with a step size of 0.02, and a step time of 1s. The XRD phases present in the samples are identified with the help of ICDD-JCPDS data files.

As shown in FIG. 4, both the catalysts exhibit completely different features. The catalyst synthesized using water as a solvent exhibits reflections due to the $Fe_3O_4$ spinel. Whereas the $NaFe_2O_4$ phase is observed in the ethanol synthesized catalyst. These measurements confirm that the catalysts made with microwave hydrothermal synthesis methods using ethanol as a solvent yields a completely different phase compared to the water synthesized catalyst, and is ultimately responsible for better desorption behavior in the upper temperature range of from about 200° C. to about 400° C.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method of making an iron based catalyst using microwave hydrothermal synthesis, the method comprising:
    dissolving iron(III) nitrate ($Fe(NO_3)_3$) in an organic solvent to form a solution;
    neutralizing the solution with an alkaline mineralizing agent comprising sodium hydroxide to obtain a precipitate;
    subjecting the solution with the precipitate to microwave radiation to cause a temperature gradient and a hydrothermal crystallization process to form a synthesized product;
    separating the synthesized product from the mineralizing agent; and
    washing and drying the synthesized product to obtain particles of sodium iron oxide ($NaFeO_2$) catalyst.

2. The method according to claim 1, wherein the mineralizing agent further comprises at least one of sodium carbonate, ammonium hydroxide, and ammonium carbonate.

3. The method according to claim 1, wherein the organic solvent comprises at least one of ethanol, propanol, butanol, and ethylene glycol.

4. The method according to claim 1, wherein the mineralizing agent comprises sodium hydroxide and the organic solvent comprises ethanol.

5. The method according to claim 1, comprising performing the hydrothermal crystallization process at a temperature of about 160° C. for about 10 minutes.

6. The method according to claim 1, wherein the organic solvent comprises a mixed-metal nitrate solute comprising iron(III) nitrate and at least one metal nitrate selection from the group consisting of cobalt nitrate, nickel nitrate, copper nitrate, and zinc nitrate.

7. The method according to claim 1, comprising dissolving cobalt nitrate with the iron(III) nitrate in the organic solvent, wherein cobalt is present relative to iron at a molar ratio within a range of from about 1:2 to about 1:3.

8. The method according to claim 1, comprising dissolving nickel nitrate with the iron(III) nitrate in the organic solvent, wherein nickel is present relative to iron at a molar ratio within a range of from about 1:2 to about 1:3.

9. The method according to claim 1, comprising dissolving copper nitrate with the iron(III) nitrate in the organic solvent, wherein copper is present relative to iron at a molar ratio within a range of from about 1:2 to about 1:3.

10. The method according to claim 1, comprising dissolving zinc nitrate with the iron(III) nitrate in the organic solvent, wherein zinc is present relative to iron at a molar ratio within a range of from about 1:2 to about 1:3.

* * * * *